United States Patent Office 3,084,636
Patented Apr. 9, 1963

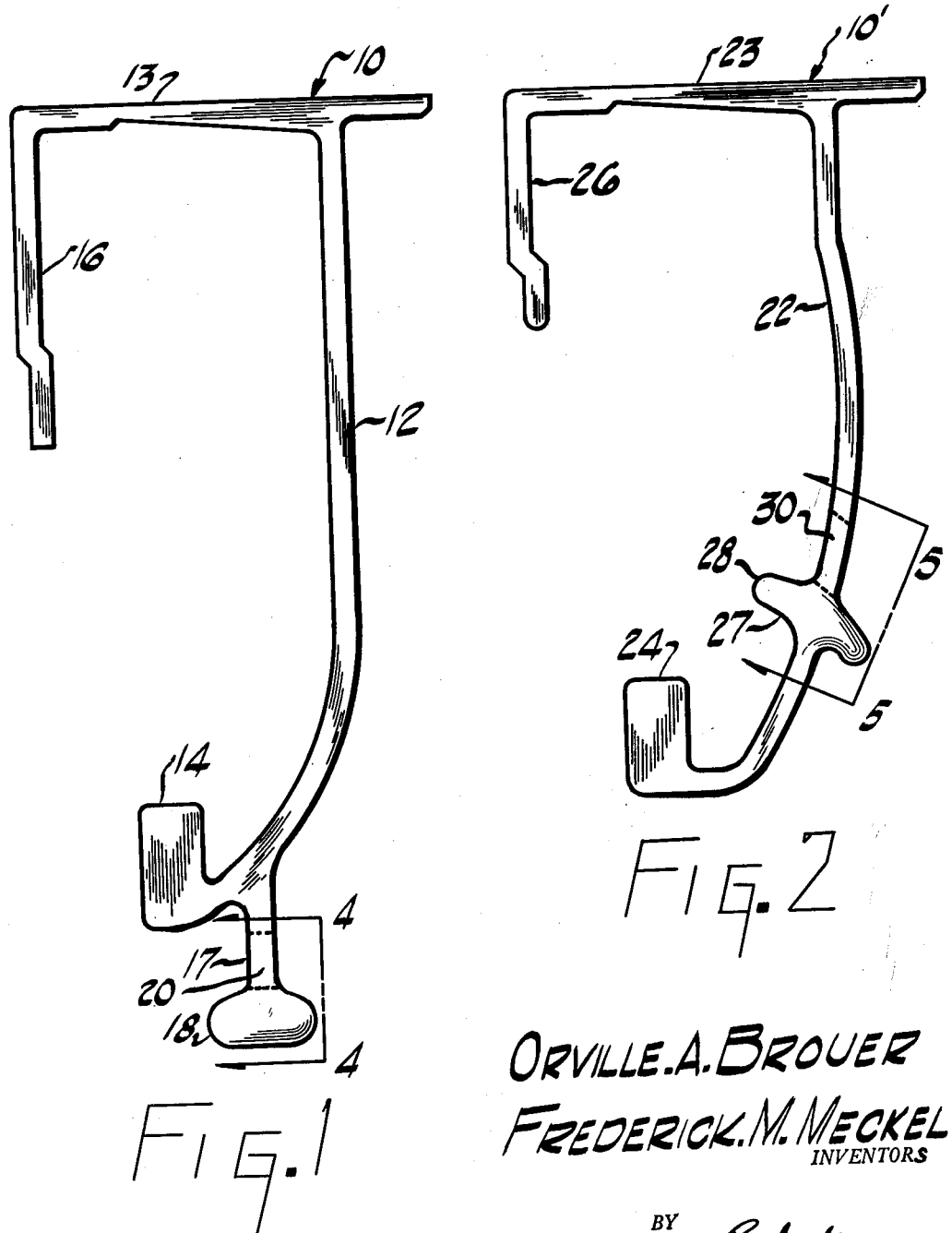

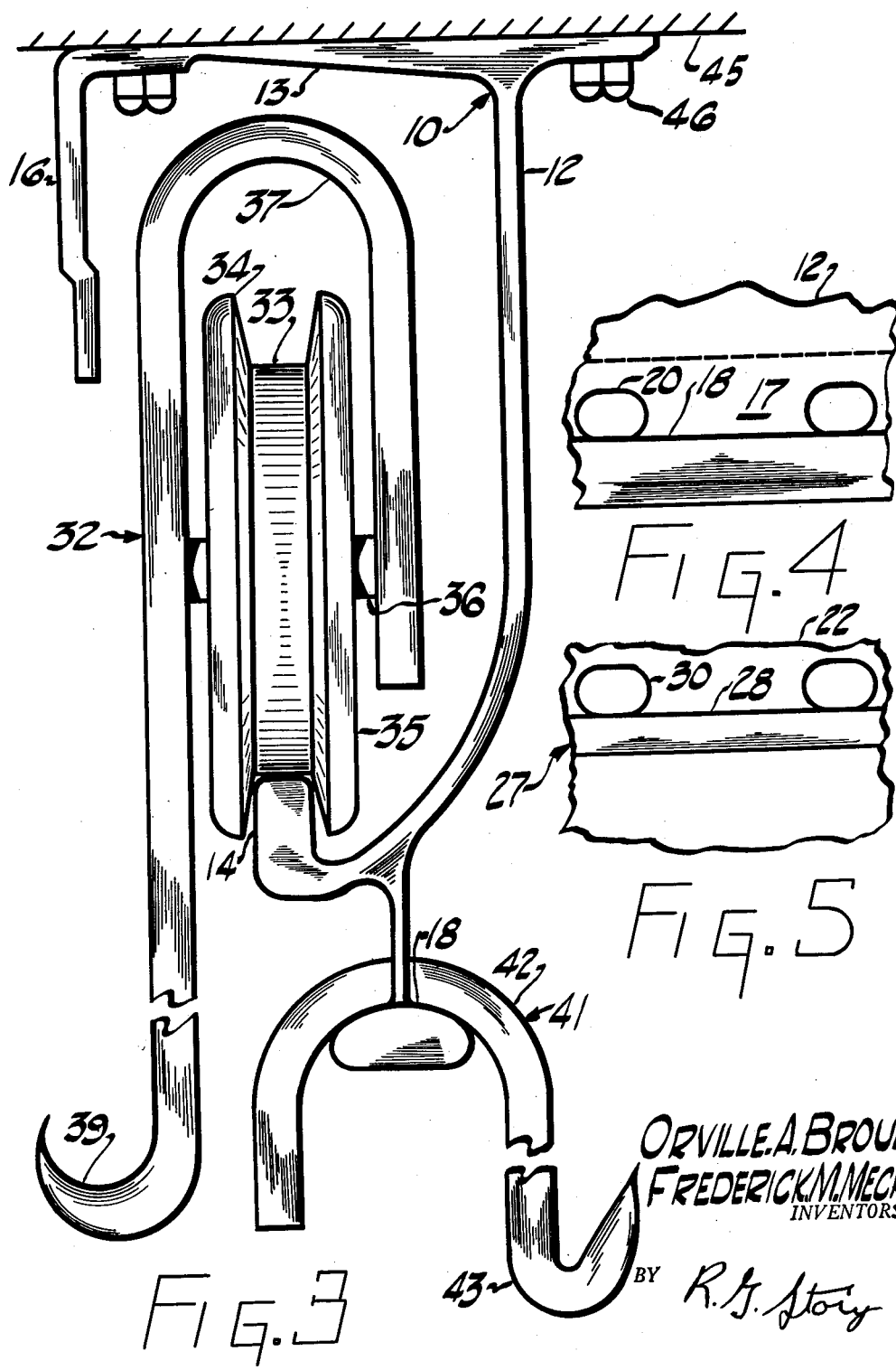

3,084,636
IMPROVED OVERHEAD RAIL
Orville A. Brouer, Western Springs, and Frederick M. Meckel, Homewood, Ill., assignors to Swift & Company, Chicago, Ill., a corporation of Illinois
Filed May 1, 1958, Ser. No. 732,368
7 Claims. (Cl. 104—111)

This invention relates to improvements in overhead track systems for delivery, transport, and storage of commodities. In particular, this improvement resides in an improved unitary structure combining means to support both mobile and stationary loads.

Heretofore, in the meat packing industry, for example, it has been the common practice to store carcass goods in refrigerated chambers by suspending the goods on hangers from an overhead rail. In the past, the rail has consisted of a simple metal bar or pipe. When the goods were moved to another location it was necessary to lift the goods from the rail and place them on separate transporting equipment, such as hand trucks, and/or manually convey them to the new location. Obviously, this has involved a great deal of labor and inconvenience, especially where the carcass goods were loaded into a vehicle such as a truck, truck-trailer, railroad car, mobile container, ship, barge or the like. For instance, the usual delivery truck has a doorway at the rear of the body with a series of simple overhead rails running from the forward end of the body to the rear thereof. In this situation it has been necessary to manually lift and carry the individual items into the body of the truck and hang them there. Usually it has been the practice to schedule several deliveries at separate points for each truck; and, therefore, it has been necessary to determine the order in which the deliveries should be made, and load the truck accordingly. The goods to be delivered at the last point would be loaded first and suspended in the forward portion of the truck body, and the goods for the earlier deliveries would be loaded successively toward the rear of the truck. Items to be delivered first were the last to be loaded at the rearmost portion of the truck. This pattern was inflexible as it was practically impossible to remove items from the truck in any manner other than in the reverse of the order of loading. When loading, each piece had to be carried into the truck and suspended; and to unload, it was necessary to take the goods down and carry them out of the truck. If it became necessary to remove items from, say, the mid portion of the truck before the goods nearer the rear were delivered, all or most of the latter had to be removed so as to provide sufficient room to take down the desired items and carry them through the rear doorway. Further, this system was uneconomical in that it did not provide for even distribution of the load throughout the vehicle.

Obviously the aforementioned system has many drawbacks. It requires a great deal of labor and time to load and unload carcass goods suspended from overhead structures in storage compartments and in vehicles. The system is inflexible, particularly with respect to delivery trucks, in that it dictates a fixed pattern for loading and unloading. In many instances, perishable material has been stored in delivery trucks for overly long periods simply because the items to be delivered last had to be loaded first.

Therefore, it is a principal object of our invention to reduce the labor requirements and inconvenience associated with the storing and transporting of goods.

Another object of our invention is to provide a system for the overhead suspension of goods whereby the goods may be loaded and unloaded in a flexible manner.

Still another object of our invention is to provide a means whereby commodities may be suspended and conveyed alternately or at the same time upon the same structure.

An additional object of our invention is to provide an overhead supporting structure adapted for use of both trolleys and hangers.

A further object of our invention is to provide a combined overhead trolley track and hanger rail for use in vehicles or the like whereby commodities may be supported and conveyed on the trolley while the commodities are suspended from relatively stationary hangers on the same structure.

Other objects and a fuller understanding of the invention may be had by referring to the following description and claims, with the accompanying drawings wherein:

FIGURE 1 is an end view of the primary embodiment of the combined overhead trolley track and hanger rail structure;

FIGURE 2 is an end view of a second embodiment of the invention;

FIGURE 3 is an end view showing the embodiment of FIGURE 1 secured to a ceiling and supporting both a trolley and a hanger;

FIGURE 4 is a partial side elevation taken at line 4—4 of FIGURE 1 showing the hanger support member; and FIGURE 5 is a partial side elevation taken at line 5—5 of FIGURE 2 showing the hanger support member of the second embodiment of this invention.

In general, this invention comprises a unitary structure, in the form of an elongated member, for supporting both movable trolleys and relatively stationary hangers. Both the trolleys and the hangers may be used to support commodities. The structure, particularly the preferred embodiment, is so devised that the trolleys and hangers may be operated and handled without interfering with one another. This is accomplished by integrally forming on a single weblike member both an upstanding trolley track and a parallel hanger support spaced therefrom.

As may be seen in FIGURE 1, the primary embodiment of this invention is a suspension member generally 10 which may be economically manufactured, for example, by extruding metal through a die. The suspension member includes a substantially J-shaped web section 12 depending from an upper mounting flange 13 and terminating in an upturned trolley track 14. Preferably one side of the upper mounting flange 13 is turned downwardly to form a trolley guide 16. Depending from the web section 12 and integrally formed therewith in a plane spaced from the plane of track 14 is a hanger support generally 17 which has a cross section resembling an inverted T and is disposed parallel and below the level of track 14. The hanger support 17 includes an upper bearing surface 18 curved transversely to better conform with a carcass hanger as seen in FIGURE 3. A plurality of holes 20 for receiving hangers are spaced along the length of the support 17 with the circumference of each hole situated essentially tangent to the bearing surface 18.

A second embodiment of the suspension member 10' is illustrated in FIGURE 2. It exhibits essentially the same features as the primary embodiment, including a substantially J-shaped web section 22 terminating in an upturned trolley track 24 and supported dependingly from an upper mounting flange 23. Similarly the upper mounting flange 23 has one side turned downwardly to form a trolley guide 26 as in the primary embodiment. However, in the second embodiment a hanger support member generally 27 is formed integrally on the web section 22 along a line spaced from track 24 and takes the form of a bearing surface 28 which extends to either side of the web section 22 and at a slight angle to the horizontal, as viewed in FIGURE 2. The bearing surface 28 is curved transversely as in the primary embodiment. Holes 30 for the hangers are provided along the length of the web section 22 and are substantially tangent to the bearing surface 28, as may be seen in FIGURE 5. In this embodiment the distance between the plane of track 24 and that of hanger support member 27 must be sufficient to accommodate the end of a hanger and a trolley if the suspension member 10' is to support both simultaneously.

The primary and preferred embodiment of this invention with associated trolley and hanger members is illustrated in FIGURE 3. As may be seen therein, a trolley generally 32 is supported essentially within the suspension member generally 10 on the trolley track 14 and between the web section 12 and the guide 16. The trolley 32 comprises a wheel 33, having flanged rims 34, 35, rotatably supported on axle 36 within frame 37. One side of the trolley frame 37 extends below the level of the suspension member and terminates in the form of a hook 39. This description applies to essentially all of the three sizes of trolleys in general use in the meat packing industry, commonly known as the beef, hog, and sales unit or branch house trolleys. The suspension member 10 may be designed to accommodate all of these trolleys. As shown in FIGURE 3, the web section 12, upper flange 13, and trolley guide 16 substantially enclose the trolley 32. This is a distinct advantage where the trolley is subjected to alternate loading and unloading or where it is used in a moving vehicle, as it will be restrained from jumping or falling from the track 14.

Also shown in FIGURE 3 is a hanger member generally 41. The hanger includes a curved upper portion 42 adapted to engage the bearing surface 18 of the hanger support member 17. The lower portion of the hanger 41 is in the form of a hook 43 for engaging a carcass or the like.

FIGURE 3 further illustrates one way in which the suspension member 10 may be secured to a ceiling 45. A sufficient number of bolts 46 are spaced along the length of the upper mounting flange 13 to secure it directly to the ceiling 45.

The mode of operation of the device will have become apparent from the foregoing description. It may be used to equal advantage in both storage buildings and in transport vehicles. The suspension member 10 is secured to the ceiling with attention given to the loads expected to be supported thereon. It is well known that rolling loads constitute a complex problem contrasted to relatively stationary loads (that is, loads applied at fixed points such as at the holes 20 along the hanger support 17) for which the strains and stresses at selected points along the suspension member may be readily calculated. Due to the curved shape of the web section 12 the effect of rolling loads will be minimized by spreading them over a large area on the upper mounting flange 13. Thus the danger of overloading the member at any particular point will be reduced.

Once the suspension member 10 is in place, one or more trolleys 32 may be set on the track 14. Also a plurality of hangers 41 may be hung on the support 17, through holes 20, or, if desired, the hangers may be stored elsewhere until they are needed. Even where the hangers are in position and supporting goods from hooks 43, the trolleys will be free to run along the length of track 14 since the track and hanger support are spaced apart.

The source of supply of the goods to be suspended is almost invariably a localized area along length of the suspension member 10. In the case of a delivery truck the source is at the rear of the truck on a loading dock or the like. To load the suspension member it is simply necessary to hang an item upon the hook 39 of a trolley 32 and then move the trolley to the desired point along track 14. At that point the item may be left hanging from the trolley or it may be easily transferred to the hook 43 of a hanger 41 located adjacent the point on the hanger support 17. The transfer operation is facilitated by the fact that both hooks 39 and 43 are at about the same level.

In some situations it will be more advantageous to suspend each item from a movable trolley. In other instances each item will best be suspended from a hanger. Obviously the present invention can fulfill the requirements of either situation equally well; and where it is provided the same equipment can be used to either advantage. Further there are occasions where it is advantageous to suspend items alternately from trolleys and hangers throughout the length of the suspension member. This is particularly true where goods of different bulk are carried together and a distinct saving of space may be achieved by hanging, say, first a large item and then a smaller item repeatedly along the suspension member.

Finally, once the items are all suspended the task of unloading them need not be held to a rigid pattern. Also the load may be distributed evenly throughout the vehicle or along the suspension member. Obviously where all or nearly all of the items are transferred from the trolley to hangers when first loaded, the track 14 will be substantially clear throughout its length. To unload any item it is merely necessary to move a trolley 32 to a point adjacent the item to be removed and then transfer the suspension of the item to the trolley. The trolley with the item is then easily moved to the discharge point and the item there removed. Should the goods suspended from hangers be partially in the path of an item on a trolley, it is a simple matter to swing them apart to allow the trolley to pass.

Obviously many modifications and alterations may be employed without departing from the spirit of the invention. For example, either or both the upper mounting flange 13 and the trolley guide member 16 may be eliminated from the unitary structure and the web section fastened directly to a building member. Also the bearing surface 18 may be altered and even eliminated under certain circumstances. Further, the suspension member may be manufactured from a variety of materials. We have found anodized aluminum alloys to be particularly adaptable to the meat packing industry. Iron and steel rails have exhibited a characteristic of rust which tends to flake off and drop upon suspended carcasses. This resulted in contamination and, in many instances, required rejection of the goods. However, where aluminum is employed, a proper anodized alloy will give the strength and hardness of a mild steel and the problem of rust is eliminated. Lastly, it should be obvious that the invention may be employed in either storage chambers or in vehicles such as trucks, truck-trailers, aircraft, railway cars, mobile containers and water-going vessels or the like.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

We claim:

1. An improved overhead rail for both mobile and stationary loads for use in vehicles and storage areas, said rail comprising: an elongated load suspension member having a generally J-shaped cross section providing a lower trolley track, a continuous curved web, and a continuous top portion adapted for securing said suspension member to a ceiling, and a continuous hanger support integrally formed on said web spaced sufficiently from said track portion so that hangers thereon will not interfere with movement of trolleys on said track.

2. An improved overhead rail for both mobile and stationary loads for use in vehicles and storage areas, said rail comprising: an elongated load suspension member having a generally J-shaped cross section providing a lower trolley track, a continuous curved web, and a continuous top flange adapted for securing said suspension member to a ceiling, said member containing a continuous hanger support formed along the web having a transversely curved upper bearing surface, said hanger support being spaced sufficiently from said track so that hangers thereon will not interfere with movement of trolleys on said track.

3. An improved overhead rail for both mobile and stationary loads for use in trailer trucks or the like, said rail comprising: a first continuous portion suitable for attachment to a ceiling, said first portion having a guide formed by one side thereof being turned downwardly; a second continuous portion depending from said first portion parallel to the edge opposite said guide, said second portion extending downwardly below the level of said guide and curving toward said guide terminating in a substantially vertically disposed trolley track; and a continuous hanger support extending parallel to and spaced from said track so that hangers thereon will not interfere with movement of trolleys on said track, said support being longitudinally formed on said second portion.

4. An improved overhead rail for both mobile and stationary loads for use in vehicles and storage areas, said rail comprising: an elongated load suspension member having a generally J-shaped cross section providing a lower trolley track, a continuous top flange adapted for securing said suspension member to a ceiling, and a continuous curved web connecting said track and said flange, said flange being turned downwardly opposite said web at a distance beyond the plane of said track and extending downwardly a distance sufficient to prevent trolleys from falling from said track in a direction away from said continuous web; and a continuous longitudinally disposed hanger support formed on said member having a plurality of spaced openings for receiving hangers, said hanger support being spaced sufficiently from said track so that hangers thereon will not interfere with movement of trolleys on said track.

5. An improved overhead rail for both mobile and stationary loads for use in vehicles and storage areas, said rail comprising: an elongated continuous load suspension member having a generally J-shaped cross section providing a lower trolley track, a continuous top flange adapted for securing said suspension member to a ceiling, and a continuous curved web connecting said track and said flange, said flange being turned downwardly opposite said web at a distance beyond the plane of said track; and a substantially continuous hanger support formed longitudinally on said member having a transversely curved upper bearing surface and a plurality of spaced openings immediately above said surface for receiving hangers, said hanger support being spaced sufficiently from said track so that hangers thereon will not interfere with movement of trolleys on said track.

6. The device of claim 5 wherein the hanger support is formed as an integral part of the web of said suspension member.

7. The device of claim 5 wherein the hanger support comprises a member having a generally inverted "T" cross section depending vertically from said web of said suspension member.

References Cited in the file of this patent

UNITED STATES PATENTS

| | | |
|---|---|---|
| 337,149 | Hale | Mar. 2, 1886 |
| 419,739 | Valley | Jan. 21, 1890 |
| 470,851 | Vose | Mar. 15, 1892 |
| 563,965 | Inman | July 14, 1896 |
| 852,784 | Hannaford | May 7, 1907 |
| 852,785 | Hannaford | May 7, 1907 |
| 865,263 | Moe | Sept. 3, 1907 |
| 1,051,780 | Terril et al. | Jan. 28, 1913 |
| 1,087,062 | Izett | Feb. 10, 1914 |
| 1,214,177 | Knutson | Jan. 30, 1917 |
| 2,761,394 | Cantrell et al. | Sept. 4, 1956 |
| 2,818,031 | Peele et al. | Dec. 31, 1957 |
| 2,819,683 | Le Full | Jan. 14, 1958 |
| 2,832,298 | Ambli | Apr. 29, 1958 |